United States Patent
Draznin et al.

(10) Patent No.: US 10,064,127 B2
(45) Date of Patent: Aug. 28, 2018

(54) AUTOMATED SERVICE PROVIDER NETWORK SELECTION USING A WIRELESS AIR-TIME AUCTION

(75) Inventors: Sagiv Draznin, Walnut Creek, CA (US); Patricia Ruey-Jane Chang, San Ramon, CA (US); Vikram K. Rawat, San Ramon, CA (US); Lalit R. Kotecha, San Ramon, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 410 days.

(21) Appl. No.: 12/979,118

(22) Filed: Dec. 27, 2010

(65) Prior Publication Data

US 2012/0166622 A1 Jun. 28, 2012

(51) Int. Cl.
*G06F 15/16* (2006.01)
*H04W 48/18* (2009.01)
*H04W 8/18* (2009.01)
*H04W 76/10* (2018.01)

(52) U.S. Cl.
CPC .............. *H04W 48/18* (2013.01); *H04W 8/18* (2013.01); *H04W 76/10* (2018.02)

(58) Field of Classification Search
CPC .................................................... H04W 48/18
USPC ................................................. 709/220, 222
See application file for complete search history.

(56) References Cited

U.S. PATENT DOCUMENTS

| | | | |
|---|---|---|---|
| 6,982,962 B1 * | 1/2006 | Lunsford et al. | 370/278 |
| 7,035,207 B2 * | 4/2006 | Winter et al. | 370/225 |
| 7,433,929 B2 * | 10/2008 | Guilford et al. | 709/217 |
| 7,577,154 B1 * | 8/2009 | Yung et al. | 370/400 |
| 7,599,323 B2 * | 10/2009 | Chandranmenon et al. | 370/328 |
| 7,603,120 B2 * | 10/2009 | Rager et al. | 455/433 |
| 7,606,570 B2 * | 10/2009 | Karaoguz et al. | 455/442 |
| 7,962,164 B2 * | 6/2011 | Karaoguz et al. | 455/515 |
| 8,073,441 B1 * | 12/2011 | Unger et al. | 455/422.1 |
| 8,185,119 B2 * | 5/2012 | Karaoguz et al. | 455/439 |
| 8,270,972 B2 * | 9/2012 | Otting et al. | 455/435.2 |
| 8,565,766 B2 * | 10/2013 | Scherzer et al. | 455/435.2 |
| 2005/0066033 A1 * | 3/2005 | Cheston et al. | 709/225 |
| 2005/0233749 A1 * | 10/2005 | Karaoguz et al. | 455/442 |
| 2009/0005041 A1 * | 1/2009 | Steinberg et al. | 455/435.2 |
| 2009/0104907 A1 * | 4/2009 | Otting et al. | 455/435.3 |
| 2010/0040025 A1 * | 2/2010 | Karaoguz et al. | 370/331 |
| 2011/0255513 A1 * | 10/2011 | Karaoguz et al. | 370/331 |
| 2012/0077488 A1 * | 3/2012 | Unger et al. | 455/432.1 |

* cited by examiner

Primary Examiner — Douglas B Blair

(57) ABSTRACT

A system is configured to store user preferences relating to selection of a network, from a group of networks, via which to establish a connection, where the user preferences includes information for selecting the network based on rates and information for selecting the network based on signal strength or quality levels; receive, from a server device that communicates with the group of networks, a set of rates associated with use of the group of networks; detect signals transmitted by the group of networks; determine, for the group of networks, signal strength or quality levels associated with the signals transmitted by the group of networks; select a particular network, of the group of networks, based on the user preferences, the set of rates, and the signal strength or quality levels; and establish a connection via the particular network.

24 Claims, 7 Drawing Sheets

| SERVICE PROVIDER NETWORK ID 305 | AIR-TIME RATE 310 | BID PERIOD 315 | SUBSCRIPTION RATE 320 | SUBSCRIPTION PERIOD 325 |
|---|---|---|---|---|
| SPN 130-1 | P1 | DATE1 | SP1 | Period1 |
| SPN 130-2 | P2 | DATE2 | SP2 | Period2 |
| SPN 130-3 | P3 | DATE3 | SP3 | Period3 |

AUTOMATED SERVICE PROVIDER NETWORK SELECTION USING A WIRELESS AIR-TIME AUCTION

BACKGROUND INFORMATION

Service provider networks enable user devices to receive a variety of services and/or perform a range of functions, such as placing calls to and/or receiving calls from user devices, receiving a variety of services, performing searches on the Internet, accessing web pages, sending and/or receiving electronic messages, etc. User devices usually register with the service provider networks in order to access the services and/or perform the functions via the service provider network. User devices usually register with the service provider networks based on a particular rate and/or price associated with a subscription (e.g., for a period of time), a quantity of air-time (e.g., a price per minute of air time and/or a price associated with a quantity of minutes of air-time etc.), a type of service to be used by the user devices (e.g., to place calls, to access the Internet, to play games, to download movies, etc).

Unfortunately, a user device may not be able to readily access other service provider networks that the user device is able to detect even when the user device is not able to detect and/or access a service provider network with which the user device is registered (e.g., due to no coverage, poor signal strength, etc.). Additionally, the other service provider networks may provide the variety of services and/or the range of functions at a price and/or rate that is less than another price and/or rate associated with the service provider network with which the user device is registered.

BRIEF DESCRIPTION OF THE DRAWINGS

FIG. 3 is a diagram of an example air-time auction data structure according to an implementation described herein;

DETAILED DESCRIPTION OF PREFERRED EMBODIMENTS

The following detailed description refers to the accompanying drawings. The same reference numbers in different drawings identify the same or similar elements. Also, the following detailed description does not limit the embodiments described herein.

Systems and/or methods, described herein, may include an air-time bid application (hereinafter referred to as a "bid application") that enables a user device to dynamically select via which service provider network to communicate. The selection of a service provider network, with which to communicate, may be based on a respective air-time rate associated with each service provider network, a respective signal strength and/or quality associated with each service provider network, and/or other factors that are specified by a user of the user device.

As described herein, the bid application may cause a user device to communicate with a mobile virtual network operator (MVNO) server in order to identify air-time rates associated with one or more service provider networks. The bid application may enable the user device to select a best price, from the identified air-time rates, and to establish a connection with a service provider network associated with the best price. In another example implementation, the bid application may enable the user device to identify signals associated with the one or more service provider networks. The bid application may, for example, enable the user device to select a best signal (e.g., based on signal strength, signal quality, etc.) from the identified signals and to establish a connection with a service provider network associated with the best signal. In yet another example implementation, the bid application may enable the user device to select a service provider network with which to communicate based on a combination of price, signal strength, signal quality, and/or other factors.

The term "communication session," as described herein, may be broadly interpreted to include establishing a connection between a user device and a service provider network that permits the user device to place and/or receive calls, to transmit and/or receive data, to request and/or receive services, etc. via the service provider network.

The systems and/or methods, described herein, may permit a user device to automatically communicate with a service provider network at a cost that is less than another cost associated with another service provider network. Additionally, or alternatively, the systems and/or methods, described herein, may permit a user device to automatically communicate with a service provider network based on a signal strength and/or a signal quality that is greater than another signal strength and/or signal quality associated with another service provider network.

Figure 1:
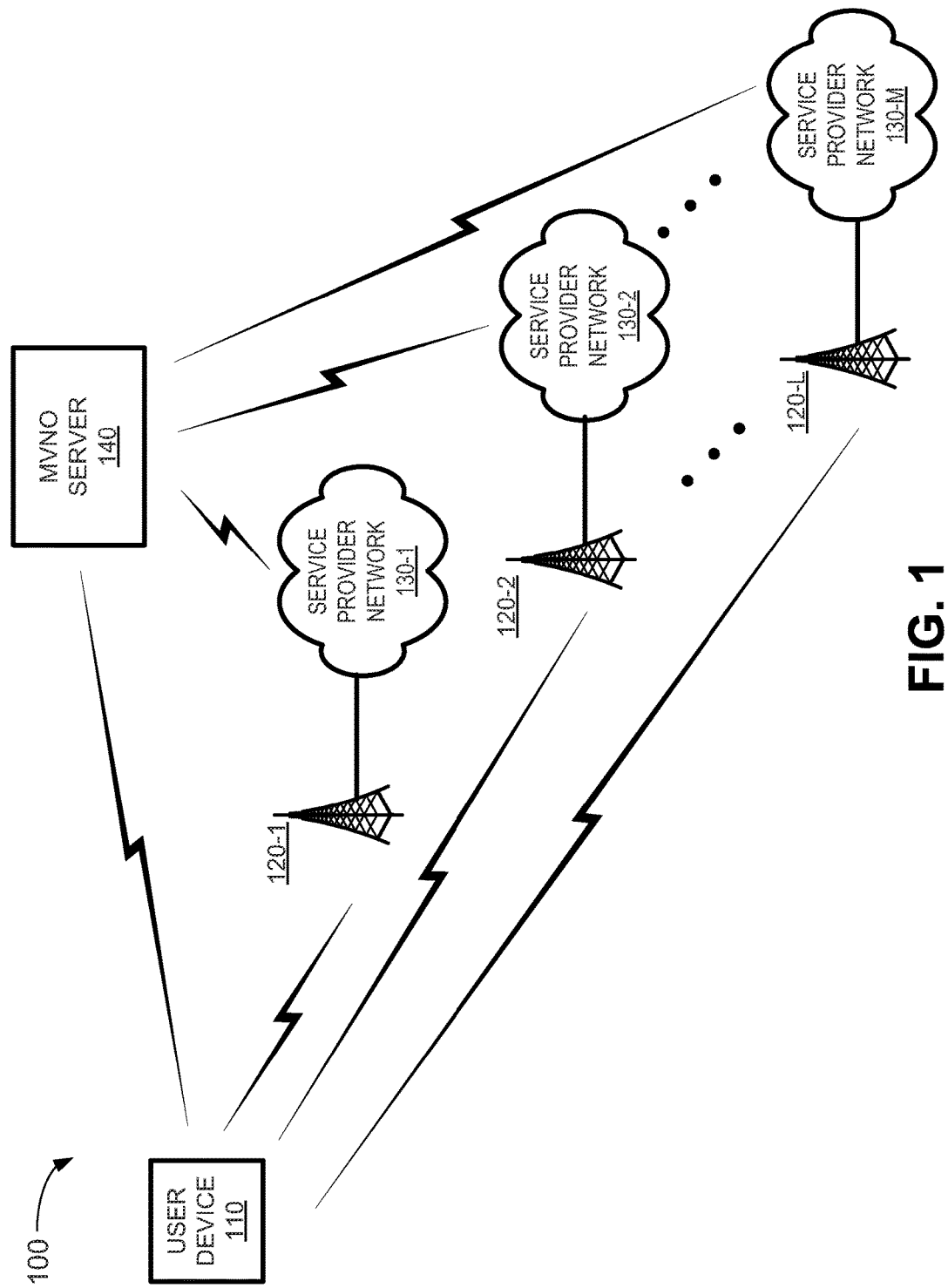
FIG. 1 is a diagram of an example environment in which system and/or methods, described herein, may be implemented.

FIG. 1 is a diagram of an example environment 100 in which system and/or methods, described herein, may be implemented. As shown in FIG. 1, environment 100 may include a user device 110, one or more base stations 120-1, 120-2, ..., 120-L (where L≥1) (hereinafter referred to collectively as "base stations 120" or individually as "base station 120"), a group of service provider networks 130-1, 130-2, ..., 130-M (where M≥1) (hereinafter referred to collectively as "SPNs 130" or individually as "SPN 130"), and a mobile virtual network operator (MVNO) server 140 (hereinafter referred to as "MVNO 140"). In practice, environment 100 may include additional devices and/or networks, fewer devices and/or networks, different devices and/or networks, or differently arranged devices and/or networks than are shown in FIG. 1. Additionally, or alternatively, one or more devices and/or networks of environment 100 may perform the tasks described as being performed by one or more other devices and/or networks of environment 100.

User device 110 may include any computation or communication device, such as a wireless mobile communication device that is capable of communicating with SPNs 130 (via base stations 120) and/or MVNO 140. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a camera, a personal gaming system, or another type of mobile computation or communication device. In an example implementation, user device 110 may host a bid application that enables user device 110 to perform automated service provider network selection operations (hereinafter referred to as "automated selection operations") that permit user device 110 to dynamically select via which of SPN 130 user device 110 is to communicate.

In one example, the bid application may permit user device 110 to perform an automated selection operation based on air-time rates associated with SPNs 130. For example, user device 110 may communicate with MVNO 140 to obtain air-time rates associated with each SPN 130. The bid application may identify a price and/or rate, that corresponds to a particular SPN 130, that is a lowest rate and/or price compared with other rates and/or prices associated with other SPNs 130. In one example, the bid application may sort the rates (e.g., from highest to lowest or vice versa) and may select the lowest rate from the sorted rates. Based on selection of the lowest rate, user device 110 may establish a communication session with the particular SPN 130 that corresponds to the lowest rate.

In another example implementation, user device 110 may use the bid application to perform an automated selection operation based on signal strength corresponding to each SPN 130. For example, user device 110 may receive signals from SPNs 130 (e.g., via base stations 120) and may determine a relative signal strength and/or signal quality associated with each of the received signals. The bid application may identify a particular signal, that corresponds to a particular SPN 130, that corresponds to the highest signal strength and/or quality compared with other signals received from other SPNs 130. In one example, the bid application may sort information associated with the signals (e.g., from highest signal strength and/or quality to lowest signal strength and/or quality, or vice versa) and may select the information that corresponds to a signal with the highest signal strength and/or quality from the sorted information associated with the signal strength. Based on selection of the signal with the highest signal strength and/or quality, user device 110 may establish a communication session with the particular SPN 130 that corresponds to the highest signal strength and/or quality.

In yet another example implementation, user device 110 may use the bid application to perform an automated selection operation based on a combination of signal strength, signal quality, and/or air-time rates that correspond to each SPN 130. In one example, a particular SPN 130 may be selected based on a respective weighting of air-time rates, signal strength levels, signal quality levels, etc. The weighting may be predetermined by the bid application and/or specified by a user of user device 110.

In still another example implementation, the bid application may cause user device 110 to perform an automated selection operation based on other criteria as specified by a user of user device 110. For example, the user may specify that user device 110 is to communicate via a particular SPN 130 (e.g., a favored SPN 130) when signals, from the particular SPN 130 are received from the particular SPN 130. In another example, the user may register with a particular SPN 130 based on a promotion offered by SPN 130 at a particular rate, for a particular quantity of air time, over a particular subscription period, etc. In yet another example, the user may specify that SPNs 130 are to be selected based on rates except when signal strength, corresponding to SPN 130 that has the lowest air-time rates are less than a threshold. In still another example, the user may specify that SPNs 130 are to be selected based on signal strength except when an air-time rate, that corresponds to SPN 130 with the greatest signal strength and/or quality, is greater than a threshold.

Based on the selection of a particular SPN 130, user device 110 may send a registration request to the particular SPN 130. The registration request may include information associated with user device 110, such as a device identifier (e.g., a mobile directory number (MDN), an international mobile subscriber identity (IMSI), a mobile station international subscriber directory number (MSISDN), a subscriber identity module (SIM) universal resource identifier (URI), etc.) and/or a device address (e.g., a media access control (MAC) address, an Internet protocol (IP) address, etc.). Additionally, or alternatively, the registration request may include information associated with a user of user device 110 (e.g., a username, password, personal identification number (PIN), etc.). User device 110 may receive, from the particular SPN 130, a confirmation (e.g., a confirmation number, etc.) that user device 110 has been registered with the particular SPN 130. User device 110 may send, to MVNO 140, information indicating that user device 110 has been registered with the particular SPN 130. User device 110 may receive, from MVNO 140, configuration information (e.g., a preferred roaming list (PRL), protocol information, bands, frequencies, etc.) that enables user device 110 to be reconfigured (e.g., based on the configuration information) in order to communicate with the particular SPN 130.

Base stations 120 may include one or more devices and other components and functionality that allow user device 110 to wirelessly connect to SPNs 130. One or more of base stations 130 may receive traffic, such as data signals, and/or real-time audio, voice and/or video signals, from SPN 130 and may transmit the received traffic to user device 110 as wireless signals. Base station 120 may receive traffic from user device 110 and may transmit the received traffic (e.g., as wired and/or wireless signals) to SPN 130 with which base station 120 is associated. In one example implementation, base station 120 may include an eNodeB that utilizes long term evolution (LTE) standards (e.g., associated with the third generation partnership project (3GPP) wireless communication standard) operating in a particular frequency band (e.g., a 700 MHz frequency band).

Base stations 130 may transmit reference signals at particular intervals. The transmitted reference signals may include information associated with signal strength and/or signal quality, such as a power level at which the signal is transmitted, and/or reference signals which may be used by user device 110 to compute metrics, such as signal-to-interference noise ratio (SINR), received reference signal received power (RSRP), path loss, reference signal received quality (RSRQ), and/or channel rank and channel quality indicators.

SPN 130 may allow the delivery of data services (e.g., IP broadband services) and/or communication services (e.g., voice over IP (VoIP)) to user device 110, and may interface with other external networks (e.g., the Internet). SPN 130 may include one or more server devices and/or other types of network devices, or other types of computation or communication devices. SPN 130 may include a cellular network, a public land mobile network (PLMN), a second generation (2G) network, a third generation (3G) network, a fourth generation (4G) network, a fifth generation (5G) network, and/or another network. SPN 130 may include a local area network (LAN), a wide area network (WAN), a metropolitan area network (MAN), an optical network, a cable television network, a satellite television network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN)), an intranet, or a combination of networks.

MVNO server 140 may include one or more server devices, or other types of computation or communication devices, that gather, process, search, store, and/or provide information in a manner similar to that described herein. MVNO 140 may communicate with SPNs 130, user device 110, and/or another network (e.g., the Internet). In an example implementation, MVNO 140 may communicate with SPNs 130 (e.g., periodically, at a particular time, in response to a request received from user device 110, etc.) to obtain prices and/or rates associated with air time (e.g., minutes), subscriptions (e.g., to received services over a subscribed period of time), information associated with promotions being offered, etc. MVNO 140 may receive the information associated with the prices and/or rates and may store the information in a data structure.

MVNO 140 may communicate with user device 110 and may provide the information associated with the prices and/or rates to user device 110. MVNO 140 may receive confirmation information from user device 110 that indicates that user device 110 has registered with a particular SPN 130 and MVNO 140 may send a request to the particular SPN 130 to obtain configuration information (e.g., information associated with a PRL, protocol information, bands, frequencies, etc.) that enables user device 110 to communicate with the particular SPN 130 and/or base stations 120 that are associated with SPN 130. MVNO 140 may send the configuration information to user device 110 that permits user device 110 to be reconfigured to communicate with the particular SPN 130.

Figure 2:
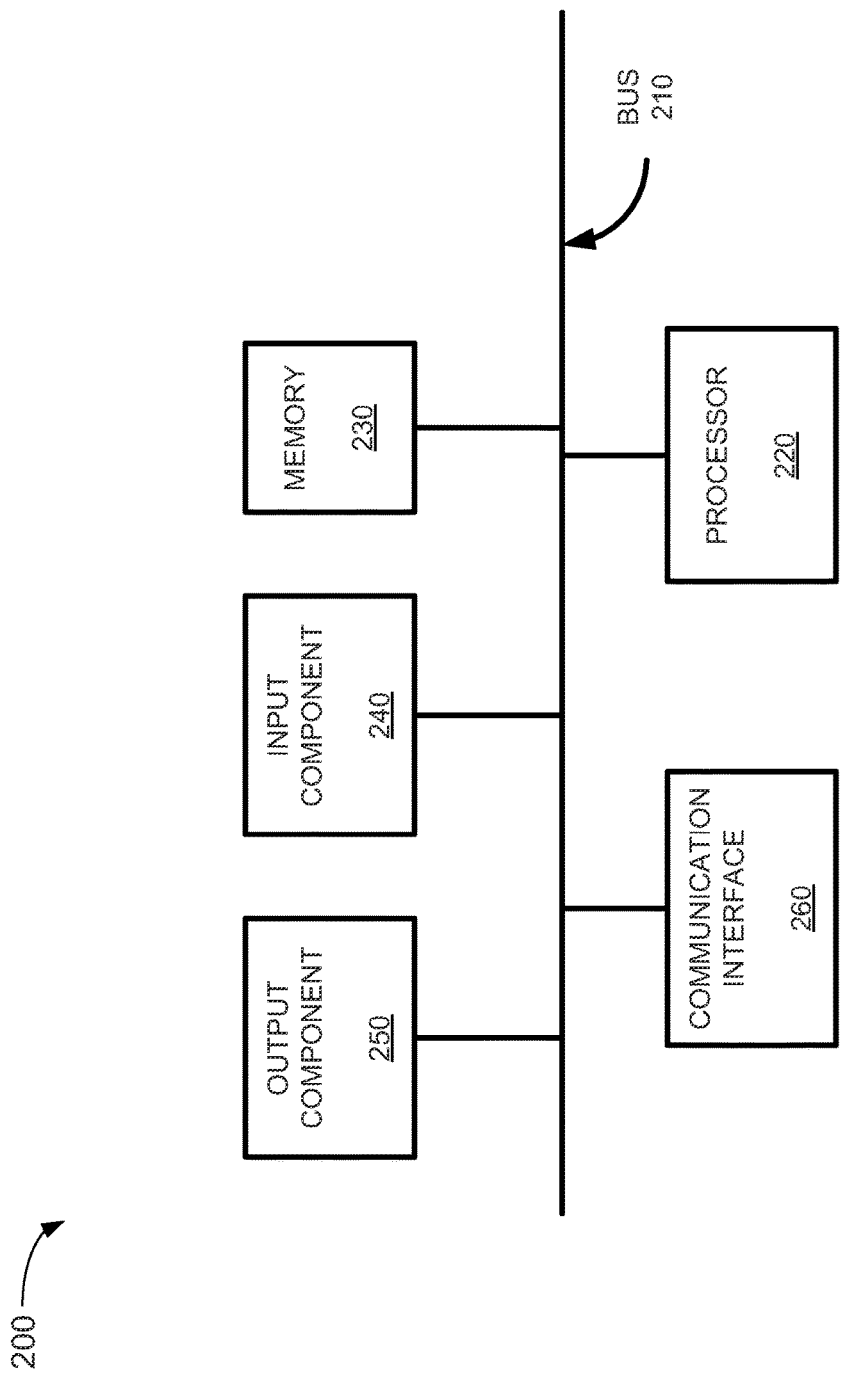
FIG. 2 is a diagram of example components of one or more of the devices of FIG. 1.

FIG. 2 is a diagram of example components of a device 200. Device 200 may correspond to user device 110 and/or MVNO 140. Alternatively, or additionally, each of user device 110 and/or MVNO 140 may include one or more devices 200. Device 200 may include a bus 210, a processor 220, a memory 230, an input component 240, an output component 250, and a communication interface 260.

Although FIG. 2 shows example components of device 200, in other implementations, device 200 may contain fewer components, additional components, different components, or differently arranged components than depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as SPN 130. In one alternative implementation, communication interface 260 may be a logical component that includes input and output ports, input and output systems, and/or other input and output components that facilitate the transmission of data to other devices.

As will be described in detail below, device 200 may perform certain operations relating to automated selection operations. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

FIG. 3 is a diagram of an example air-time auction data structure 300 (hereinafter referred to as "data structure 300") according to an implementation described herein. In one implementation, one or more data structures 300 may be stored in a storage device included as part of memory 230 of user device 110 and/or MVNO 140. In another implementation, data structure 300 may be stored in a memory associated with another device or a group of devices, separate from or including user device 110 and/or MVNO 140.

As shown in FIG. 3, data structure 300 may include a service provider network identifier (ID) field 305, an air-time rate field 310, a bid period field 315, a subscription rate field 320, and a subscription period field 325. Although FIG. 3 shows example fields of data structure 300, in other implementations, data structure 300 may contain fewer fields, different fields, additional fields, or differently arranged fields than depicted in FIG. 3. Additionally, or alternatively, one or more fields of data structure 300 may include information described as being included in one or more other fields of data structure 300.

Service provider network ID field 305 may store information associated with a particular service provider network (e.g., SPN 130). Air-time rate field 310 may store information associated with a price for services to be received from the particular SPN 130. For example, the particular SPN 130 may transmit a bid to MVNO 140 that identifies a price to be charged for services, which MVNO 140 may store in air-time rate field 310, such as a price per unit of time (e.g., price per minute), a fixed price (e.g., a fixed price for a quantity of time), a price for particular services (e.g., a price associated with text messaging, another price for calls, a further price for gaming, etc.). Bid period field 315 may store a period of time during which the air-time rate is valid. For example, MVNO 140 may receive an air-time rate, which may include a period of time during which the air-time rate is in effect (e.g., 12 hours, 24 hours, prime time hours, 1 week, etc.). Subscription rate field 320 may store a price associated with a subscription for services. For example, MVNO 140 may receive a subscription rate associated with a subscription for services to be received from the particular SPN 130, during a period that corresponds to the subscription. MVNO 140 may store the received subscription rate in subscription rate field 320. Subscription period field 325 may store information associated with a subscription period (e.g., one week, one month, six months, etc.) during which the subscription rate is in effect. For example, the subscription period may generally be greater than the bid period.

MVNO 140 may receive air-time auction information, such as information associated with air-time rates, bid periods, subscription rates, subscription periods, etc. from each of SPNs 130. For example, MVNO may receive air-time auction information from a particular SPN 130 and may store, in data structure 300, information associated with the particular SPN 130 (e.g., SPN 130-1), an air-time rate (e.g., P1) associated with services to be received from the particular SPN 130, and/or a bid period that identifies a date and/or time when the air-time rate is no longer in affect (e.g., date1) (e.g., as shown by ellipse 330). MVNO 140 may also receive air-time auction information from the particular SPN 130 and may store, in data structure 300, information associated with subscription rate (e.g., SP1) associated with a subscription for services to be received from the particular SPN 130, and/or a subscription period (e.g., period1) during which the subscription and/or the subscription rate is to be in effect (e.g., as shown by ellipse 330).

MVNO 140 may receive other air-time auction information from other SPNs 130 and may store, in data structure 300, information associated with the other SPNs 130 (e.g., SPN 130-2, SPN 130-3, etc.), air-time rates (e.g., P2, P3, etc.) associated with services to be received from the other SPNs 130, and/or bid periods that identify dates and/or times when the air-time rates are no longer in affect (e.g., date2, date3, etc.) (e.g., as shown by ellipses 332 and 334). MVNO 140 may also receive other air-time auction information from the other SPNs 130 and may store, in data structure 300, information associated with subscription rates (e.g., SP2, SP3, etc.) associated with subscriptions for services to be received from the other SPNs 130, and/or subscription periods (e.g., period2, period3, etc.) during which the subscriptions and/or the subscription rates are to be in effect (e.g., as shown by ellipses 332 and 334).

Figure 4:
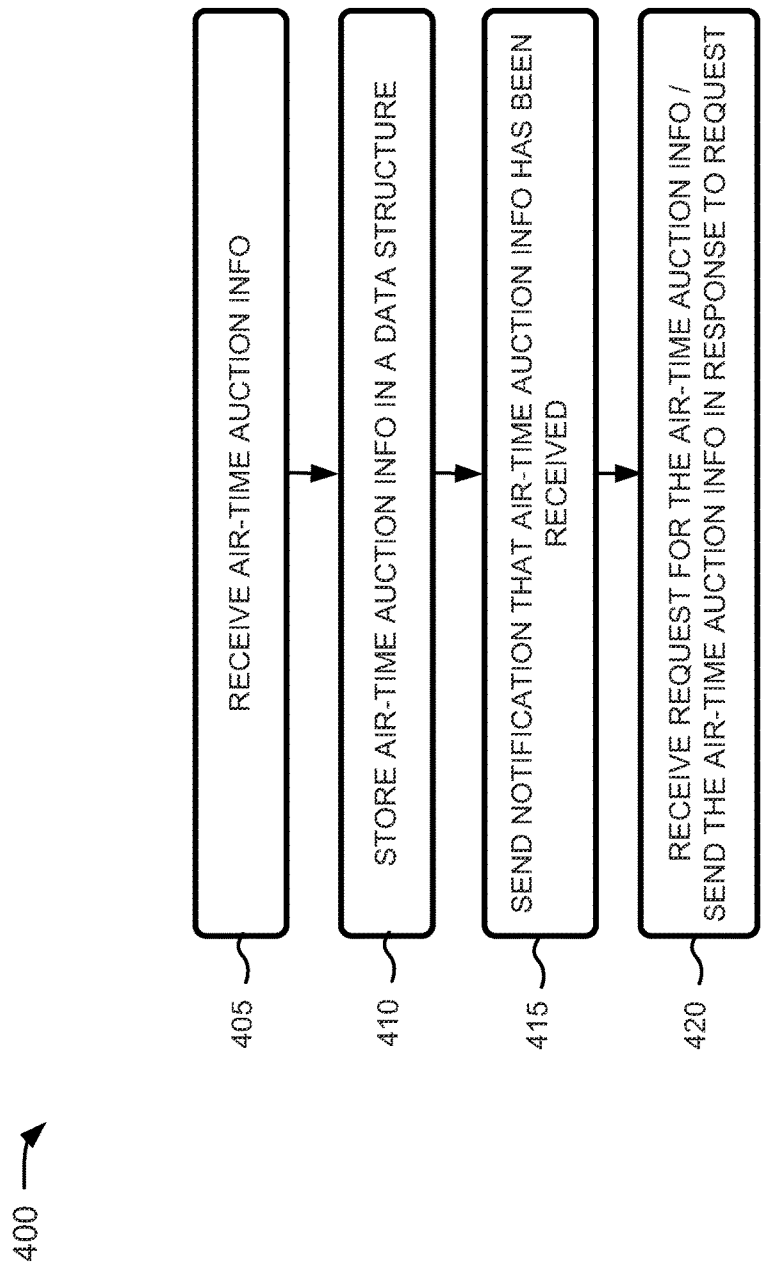
FIG. 4 is a flow chart of an example process for obtaining air-time auction information from service provider networks according to an implementation described herein.

FIG. 4 is a flow chart of an example process for obtaining air-time auction information from SPNs 130 according to an implementation described herein. In one implementation, process 400 may be performed MVNO 140. In other implementations, some or all of process 400 may be performed by another device or a group of devices separate from or including MVNO 140.

As shown in FIG. 4, process 400 may include receiving air-time auction information from SPNs 130 (block 405) and storing the air-time auction information in a data structure (block 410). For example, MVNO 140 may receive, from one or more SPNs 130, air-time auction information and MNVO 140 may store, in a data structure (e.g., data structure 300 of FIG. 3), the air-time auction information. MVNO 140 may, for example, receive air-time auction information periodically (e.g., every 12 hours, every 24 hours, at a particular time of day, a quantity of times per week, etc.). In another example, MVNO 140 may receive the air-time information upon the occurrence of some event (e.g., when MVNO 140 and/or user device 110 sends a request for updated air-time auction information). In yet another example, MVNO 140 may receive air-time auction information when all or a portion of the air-time auction information, associated with a particular SPN 130, changes (e.g., when an air-time rate changes, a bid period changes, etc.). In still another example, MVNO 140 may send a request to all or a portion of SPNs 130, for updated air-time auction information. In yet another example, MVNO 140 may send a request, to one or more SPNs 130, for a more competitive air-time rate, for modified subscription terms, offers to participate in a promotion (e.g., a holiday rate promotion, etc.).

As also shown in FIG. 4, process 400 may include sending a notification that air-time auction information has been received (block 415). For example, MVNO 140 may send a notification, to user device 110, that indicates that air-time auction information (or updated air-time auction information) is available to be downloaded. In one example, the notification may be presented for display on user device 110 (e.g., by a bid application hosted by user device 110) that permits the user to view the latest air-time rates, subscription rates, etc. In another example, the notification may indicate that particular rates, associated with a particular SPN 130, have changed (e.g., relative to a threshold). In still another example, the notification may include advertising and/or promotional information associated with one or more SPNs 130 and/or MVNO 140.

As further shown in FIG. 4, process 400 may include receiving a request for the air-time auction information and sending the air-time auction information in response to the request (block 420). For example, user device 110 may receive the notification that the air-time auction information is available to be downloaded and may, in response to the notification, send a request to MVNO 140 to download the air-time auction information. MVNO 140 may receive the request and may send the air-time auction information to user device 110. In an example implementation, MVNO 140 may send a portion of the air-time auction information that corresponds to preferences associated with a user of user device 110 (e.g., obtained as a result of a set up operation associated with user device 110). In another example implementation, MVNO 140 may send the air-time auction information without receiving a request from user device 110.

In another example, user device 110 may send the request at a later point in time (e.g., based on a time specified by the user). For example, user device 110 may send the request during a period of time when user device is being charged, when user device is dormant (e.g., during nighttime hours), when user device 110 is powered up, etc. In another example, user device 110 may send the request when a rate, associated with a preferred SPN 130 and/or some other SPN 130, changes by an amount that exceeds a threshold. User device 110 may receive updated air-time auction information and may perform an automated selection operation based on the updated air-time auction information.

Figure 5:
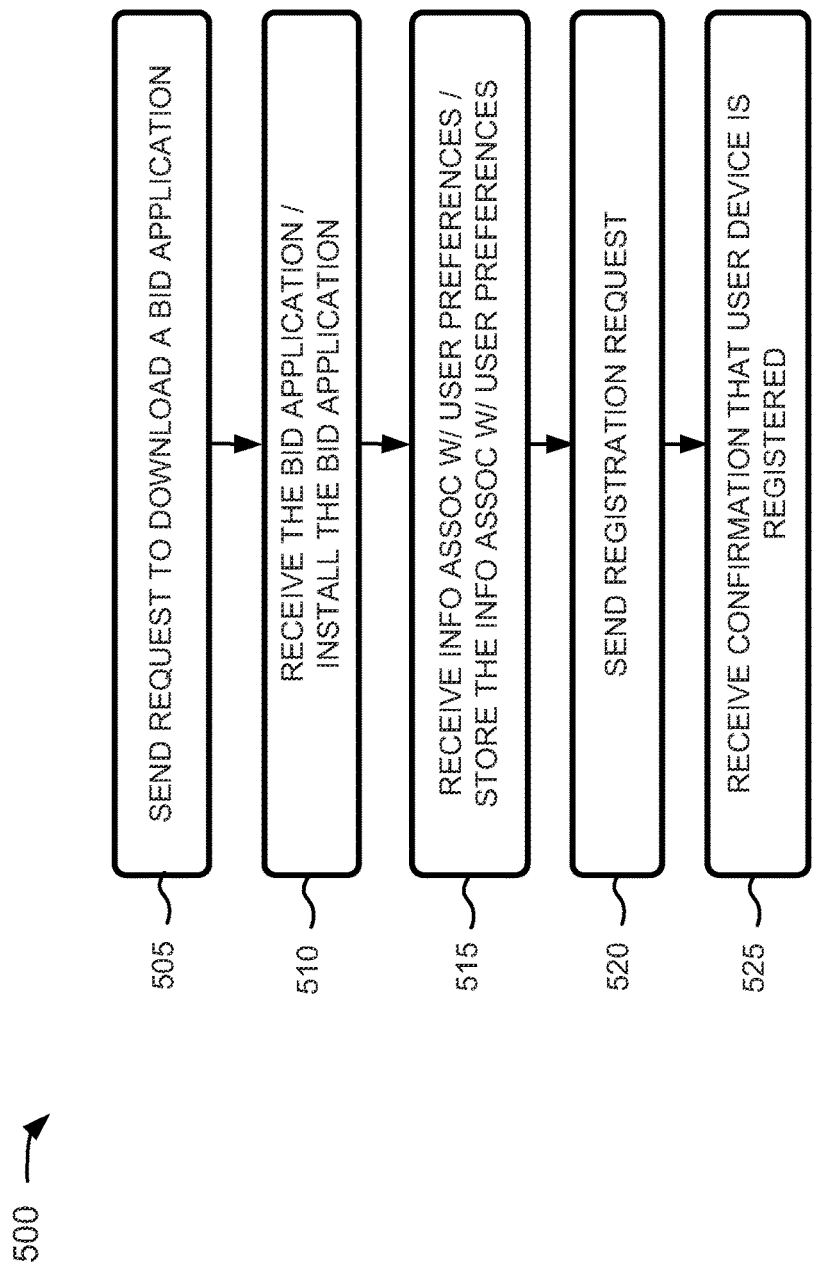
FIG. 5 is a flow chart of an example process for setting up a user device to perform automated service provider network selection operations according to an implementation described herein.

FIG. 5 is a flow chart of an example process 500 for setting up user device 110 to perform automated selection operations according to an implementation described herein. In one implementation, process 500 may be performed by user device 110 and/or MVNO 140. In other implementations, some or all of process 500 may be performed by another device or a group of devices separate from or including user device 110 and MVNO 140.

As shown in FIG. 5, process 500 may include sending a request to download a bid application (block 505). For example, user device 110 may send a request to MVNO 140 to download a bid application that user device 110 may use to perform automated selection operations. MVNO 140 may receive the request and may send a request for registration information from user device 110. User device 110 may receive the request and may send registration information to MVNO 140. The registration information may include information associated with user device 110 (e.g., a device identifier, a device address, etc.) and/or information associated with a user of user device 110 (e.g., username, password, PIN, address information, etc.). MVNO 140 may receive the registration information and may store the registration information in a memory associated with MVNO 140. MVNO 140 may send, to user device 110, a notification confirming that user device 110 has been registered, which may include confirmation information (e.g., a confirmation number, a registration token, etc.). Based on the registration of user device 110, MVNO 140 may send a bid application to user device 110.

As also shown in FIG. 5, process 500 may include receiving the bid application and installing the bid application (block 510). For example, user device 110 may receive the bid application and may store, in a memory associated with user device 110, the bid application. Additionally, user device 110 may install the bid application, which enables the bid application to present a set up user interface (UI), for display on user device 110, via which the user may enter information associated with user preferences.

As further shown in FIG. 5, process 500 may include receiving information associated with user preferences and storing the information associated with the user preferences (block 515). For example, the user may enter, via the set up UI, information associated with user preferences and user device 110 may receive the information associated with the user preferences via the set up UI. The information associated with the user preferences may indicate a preferred manner in which user device 110 selects via which SNP 130 to establish a communication session and/or a manner in which user device 110 receives updated air-time auction information. In one example, the user may specify that user device 110 is to select a particular SPN 130 based on a best price for services (e.g., associated with air-time rates, subscription rates, etc.). In another example, the user may specify that user device 110 is to select the particular SPN 130 based on a best signal relative to other signals received from SPNs 130 (e.g., based on highest signal strength and/or quality, etc.). In yet another example, the user may specify that the particular SPN 130 is to be selected based on a combination of price and signal strength and/or quality (e.g., a best price associated with signal strength and/or quality that is greater than a threshold). In this example, the user may determine manner in which price, signal strength, signal quality, and/or other factors are to be weighting when determine which SPN 130 to select. In still another example, the user may specify that the particular SPN 130 is to be selected based on other factors that are not primarily based on price, signal strength and/or signal quality, such as a favorite SPN 130, a favorite SNP 130 at a particular location, etc.

The user may also specify a manner in which air-time auction information updates are to be received by user device 110. For example, the user may specify that the updates are to be received periodically (e.g., based on a time interval, such as every 12 hours, every 24 hours, etc.), at a particular time (e.g., overnight, a particular time of day, etc.), and/or upon the occurrence of some event (e.g., in response to a user request, when notifications are received from MVNO 140 that updates are available, when user device 110 is charging, when user device 110 is powered up, etc.). User device 110 may store the information, associated with user preferences, in a memory associated with user device 110.

As yet further shown in FIG. 5, process 500 may include sending a registration request (block 520) and receiving confirmation that user device 110 is registered (block 525). For example, user device 110 may send the information associated with user preferences to MVNO 140. MVNO 140 may receive the information associated with the user preferences and may store the information associated with the user preferences in a memory associated with MVNO 140. MVNO 140 may, in response to receiving the information associated with the user preferences, send air-time auction information to user device 110. User device 110 may receive the air-time auction information and may store the air-time auction information in a data structure (e.g., data structure 300 of FIG. 3) within a memory of user device 110.

Figure 6A:
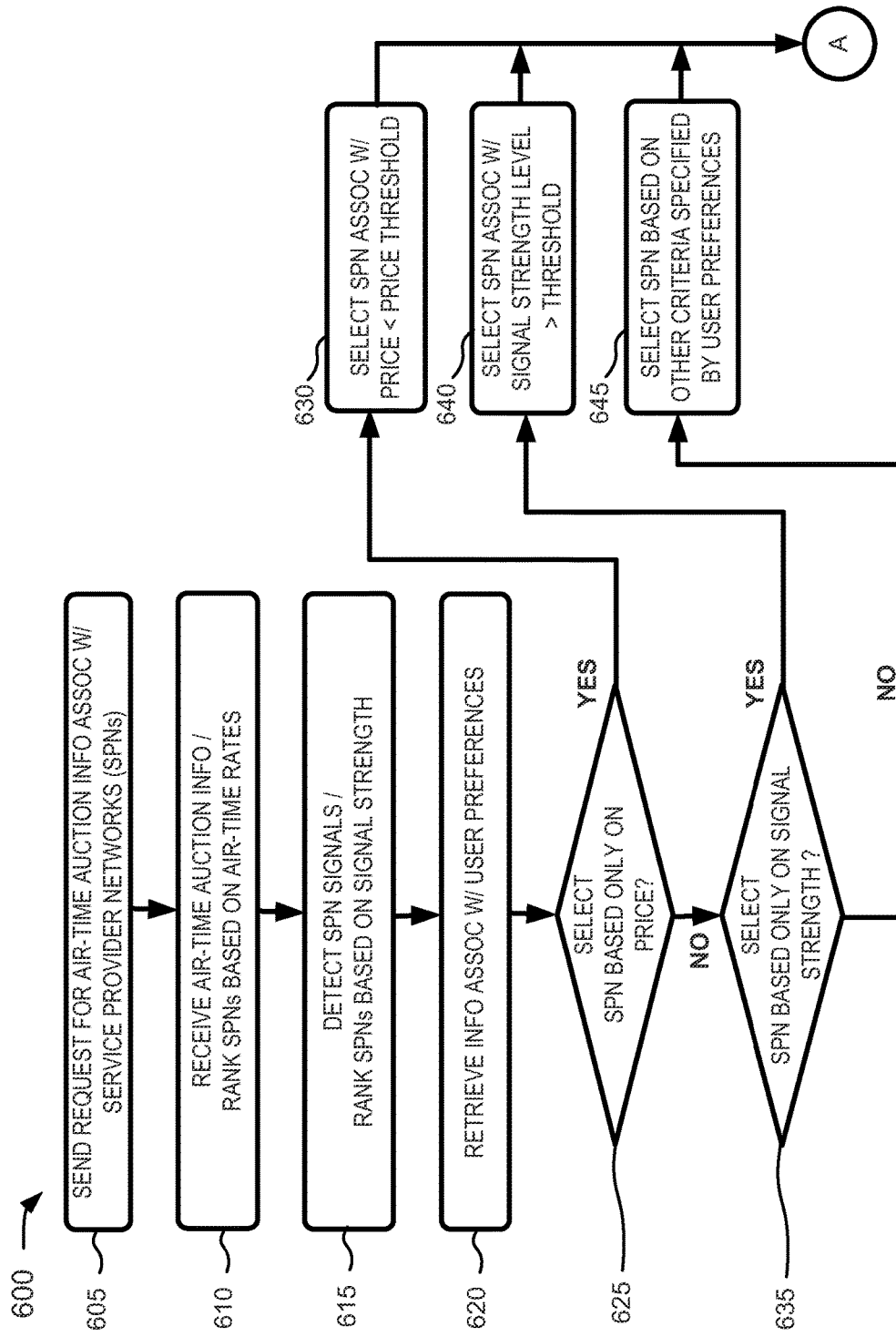
FIGS. 6A and 6B are flow charts of an example process for selecting a service provider network via which to communicate according to an implementation described herein.
Figure 6B:
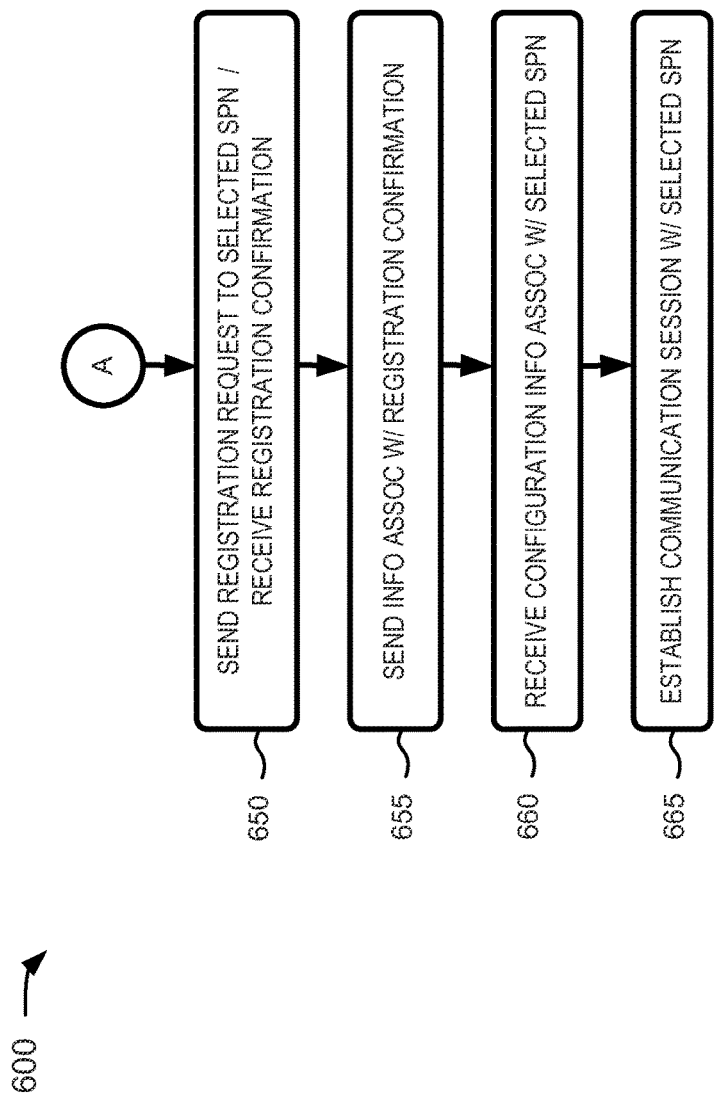

FIGS. 6A and 6B are flow charts of an example process 600 for a selecting SPN 130 via which to establish a communication session according to an implementation described herein. In one implementation, the process of FIGS. 6A and 6B may be performed by user device 110. In other implementations, some or all of the process 600 may be performed by another device or a group of devices separate from or in combination with user device 110.

As shown in FIG. 6A, process 600 may include sending a request for air-time auction information associated with SPNs 130 (block 605). For example, a bid application, hosted by user device 110, may send a request, to MVNO 140, for air-time auction information. The bid application may send the request for the air-time auction information at a particular time that is predetermined by the bid application. In another example, the bid application may send the request for air-time auction information at a particular point in time, over a particular period of time (e.g., overnight, etc.), and/or upon the occurrence of some event (e.g., when user device 110 is charging, when user device 110 powers up, in response to a notification from MVNO 140 that updated air-time auction information is available, etc.) as predetermined by the bid application and/or based on preferences specified by the user of user device 110. In yet another example, the bid application may send the request for air-time auction information in response to a request received from the user (e.g., when the user presses a button or series of buttons on user device 110, etc.).

MVNO 140 may receive the request and may retrieve the air-time auction information from a data structure stored in a memory associated with MVNO 140. In another example, MVNO 140 may, in response to the request, send a query to a group of SPNs 130 to obtain the air-time auction information. MVNO 140 may send the air-time auction information to user device 110 in response to the request. In another example, MVNO 140 may automatically send the air-time auction information when user device 110 does not send a request. In this example, MVNO 140 may send the air-time auction information automatically (e.g., at a particular point in time, periodically, when particular air-time information has not been updated within a particular period of time, etc.).

As also shown in FIG. 6A, process 600 may include receiving air-time auction information and ranking SPNs 130 based on air-time rates (block 610). For example, user device 110 may receive the air-time auction information from MVNO 140 and may identify air-time rates and/or subscription rates associated with services that are offered by all or a portion of the group of SPNs 130. In one example, the bid application may identify a particular SPN 130 that corresponds to a lowest air-time rate and/or subscription rate from among the one or more air-time rates and/or subscription rates included in the air-time auction information. In another example, the bid application may sort and/or rank the group of SPNs 130 based on air-time rates and/or subscriptions rates (e.g., in ascending or descending order) associated with the group of SPNs 130. For example, SPN 130-1 may be assigned a ranking (e.g., $AR_1$) based on a corresponding air-time rate (e.g., $P_1$), SPN 130-2 may be assigned another ranking (e.g., $AR_2$) based on a corresponding air-time rate (e.g., $P_2$), etc. The bid application may rank SPN 130-1 higher than SPN 130-2 (e.g., $AR_1 > AR_2$) when the corresponding air-time rate is less than the other corresponding air-time rate (e.g., $P_1 < P_2$). The bid application may use the sorted and/or ranked SPNs 130 to identify one or more SPNs 130 that are associated with air-time rates and/or subscription rates that are less than a threshold (e.g., a threshold that is predetermined by the bid application and/or specified by the user of user device 110).

As further shown in FIG. 6A, process 600 may include detecting SPN 130 signals and ranking SPNs 130 based on signal strength (block 615). For example, user device 110 may detect one or more signals being transmitted by all or a portion of the group of SPNs 130. In one example, the bid application may identify a particular SPN 130 that corresponds to a signal with a highest signal strength level and/or signal quality level from among the one or more signals being detected. In another example, the bid application may sort and/or rank the group of SPNs 130 based on a respective signal power level and/or signal quality level associated with each of the signals being detected from the group of SPNs 130 (e.g., in ascending or descending order). For example, SPN 130-1 may be assigned a ranking (e.g., $SR_1$) based on a corresponding signal strength level and/or quality level (e.g., $L_1$), SPN 130-2 may be assigned another ranking (e.g., $SR_2$) based on a another corresponding signal strength level and/or quality level (e.g., $L_2$), etc. The bid application may rank SPN 130-1 higher than SPN 130-2 (e.g., $SR_1 > SR_2$) when the corresponding signal strength level and/or quality level is greater than the other corresponding signal strength level and/or quality level (e.g., $L_1 > L_2$). The bid application may use the ranked and/or sorted SPNs 130 to identify one or more SPNs 130 associated with a signal strength level and/or signal quality level that is greater than a threshold (e.g., a threshold that is predetermined by the bid application and/or specified by a user of user device 110.

The bid application may identify the signal strength level based on a quantity of signal power (e.g., an average power, a root mean square (rms) power, a peak power, a signal-to-noise ratio (SNR), a signal-to-interference noise ratio (SINR), a reference signal received power (RSRP), etc.) as measured by user device 110. Additionally, or alternatively, the bid application may identify the signal quality level based on a quantity of signal quality (e.g., a reference signal received quality (RSRQ), a channel rank, a quantity of channel isolation, channel quality indicators, etc.). The quantity of signal quality may indicate a level of channel isolation and/or interference associated with a received signal.

As yet further shown in FIG. 6A, process 600 may include retrieving information associated with user preferences (block 620). For example, the bid application may retrieve, from a memory associated with user device 110, information associated with user preferences to determine a manner in which an automated selection operation is to be performed. The bid application may determine, from the information associated with the user preferences, whether the particular SPN 130 is to be selected based on air-time rates and/or subscription rates, signal strength level and/or quality level, and/or other factors.

As still further shown in FIG. 6A, if SPN 130 is to be selected based only on price (block 625—YES), then process 600 may include selecting SPN 130 associated with a price that is less than a threshold (block 630). For example, the bid application may determine that the information associated with the user preferences indicates that the particular SPN 130 is to be selected based only on air-time rates and/or subscription rates that are less than a threshold. Based on the determination that the user preferences indicate that the particular SPN 130 is to be selected based only on air-time rates and/or subscription rates that are less than a threshold, the bid application may use information associated with the ranked and/or sorted group of SPNs 130 (e.g., described above with respect to block 610) to identify one or more SPNs 130 associated with air-time rates and/or subscription rates that are less than threshold. Based on a determination that more than one SPN 130 are associated with air-time rates and/or subscription rates that are less than the threshold, the bid application may, in one example, select a particular SPN 130 (e.g., from the ranked or sorted SPNs 130) that is associated with a lowest air-time rate and/or subscription rate from among the one or more SPNs 130. In another example, the bid application may use information associated with the ranked and/or sorted group of SPNs 130 (e.g., described above with respect to block 615) to select the particular SPN 130 that is associated with a highest signal strength level and/or quality level from among the one or more SPNs 130 that are associated with air-time rates and/or subscription rates that are less than the threshold.

As also shown in FIG. 6A, if SPN 130 is not to be selected based only on price (block 625—NO), and if SPN 130 is to be selected based only on signal strength (block 635—YES), then process 600 may include selecting SPN 130 associated with a signal strength level that is greater than a threshold (block 640). For example, the bid application may determine that the information associated with the user preferences indicates that the particular SPN 130 is not to be selected based only on air-time rates and/or subscription rates. Additionally, or alternatively, the bid application may determine that the information associated with the user preferences indicates that the particular SPN 130 is to be selected based only on signal strength levels and/or signal quality levels that are greater than a threshold. Based on the determination that the user preferences indicate that the particular SPN 130 is to be selected based only on signal strength levels and/or signal quality levels that are greater than the threshold, the bid application may use information associated with the ranked and/or sorted group of SPNs 130 (e.g., described above with respect to block 615) to identify one or more SPNs 130 associated with signal strength levels and/or quality levels that are greater than the threshold. Based on the determination that more than one SPN 130 are associated with signal strength levels and/or quality levels that are greater than the threshold, the bid application may, in one example, select a particular SPN 130 associated with a highest signal strength level and/or signal quality level (e.g., from the ranked and/or sorted SPNs 130) from among the one or more SPNs 130. In another example, the bid application may use information associated with the ranked and/or sorted group of SPNs 130 (e.g., described above with respect to block 610) to select a particular SPN 130 that is associated with a lowest air-time rate and/or subscription rate from among the one or more SPNs 130 associated with signal strength levels and/or quality levels that are greater than the threshold.

As further shown in FIG. 6A, if SPN 130 is not to be selected based only on price (block 625—NO), and if SPN 130 is not to be selected based only on signal strength (block 635—NO), then process 600 may include selecting SPN 130 based on other criteria specified by user preferences (block 645). For example, the bid application may determine that the information associated with the user preferences indicates that the particular SPN 130 is not to be selected based only on air-time rates and/or subscription rates or only on signal strength levels and/or signal quality levels. Based on the determination that the user preferences indicate that the particular SPN 130 is not to be selected based only on the air-time rates and/or subscription rates or only the signal strength levels and/or signal quality levels, the bid application may select the particular SPN 130 based on other factors as specified by the user preferences.

In one example, the information associated with the user preferences may identify a preferred SPN 130 and the bid application may select the preferred SPN 130 with which to establish a communication session based on the identification of the preferred SPN 130 from the user preferences. In this example, the user preferences may identify other preferred SPNs 130 to be selected in the event that a signal, from the preferred SPN 130, is not detected or has a signal strength level and/or quality level that is less than a threshold. In another example, the user preferences may specify that another network is to be determined based on air-time rates and/or subscription rates or signal strength and/or quality, as described above.

In another example, the user may specify that the particular SPN 130 is to be selected based on signal strength and/or signal quality when the air-time rates and/or subscription rates are greater than a price threshold and/or when air-time rates and/or subscription rates match other air-time and/or subscription rates, respectively. In yet another example, the user may specify that a particular SPN 130 is not to be selected when air-time rates and/or subscription rates, associated with the particular SPN 130 are greater than a maximum rate. In still another example, the user may specify a preferred SPN 130 that is to be selected when user device 110 is located at a particular location.

In another example implementation, the user may specify that the particular SPN 130 is to be selected based on a weighted combination of signal strength and/or quality and air-time and/or subscription rates. For example, the user may specify that selection of the particular SPN 130 is to be based a weight (e.g., based on a signal weighting factor, $W_S$) associated with SPN 130 rankings based on signal strength levels and/or quality levels (e.g., $SR_1$, $SR_2$, $SR_3$, etc.) and another weight (e.g., based on a price weighting factor, $W_P$) associated with SPN 130 rankings based on air-time rates and/or subscription rates (e.g., $AR_1$, $AR_2$, $AR_3$, etc.). The bid application may generate a weight score for each SPN 130 (e.g., a score associated with SPN 130-1 may correspond to $Total_1=WS*SR_1+WP*AR_1$; a score associated with SPN 130-2 may correspond to $Total_2=WS*SR_2+WP*AR_2$). The bid application may rank SPNs 130 based on the respective total score associated with each of SPNs 130 (e.g., $Total_1>Total_3>Total_2$, etc.) and may select a particular SPN 130 associated with a greatest total score.

As shown in FIG. 6B, process 600 may include sending a registration request to a selected SPN 130 and receiving a registration confirmation (block 650). For example, having selected the particular SPN 130 with which to establish a communication session, the bid application may cause user device 110 to send a registration request to the particular SPN 130 (e.g., via a particular base station 120 associated with the particular SPN 130). The registration request may include information associated with user device 110 (e.g., a device identifier, a device address, etc.) and/or information associated with a user of user device 110 (e.g., username, password, PIN, etc.). The particular SPN 130 may receive the registration request and may authenticate user device 110 based on the information associated with user device 110 and/or the information associated with the user. Based on a successful authentication, the particular SPN 130 may register the user device 110 and may send a notification, to user device 110, confirming that user device 110 is registered with the particular SPN 130. The notification may include confirmation information (e.g., a confirmation number, etc.). User device 110 may receive the notification confirming the registration and may store the confirmation information in a memory associated with user device 110.

As also shown in FIG. 6B, process 600 may include sending information associated with the registration confirmation (block 655) and receiving configuration information associated with the selected SPN 130 (block 660). For example, user device 110 may send, to MVNO 140, a request to receive configuration information from the particular SPN 130. The request may include the confirmation information received from the particular SPN 130 when registering with the particular SPN 130. MVNO 140 may receive the request and may send a request for configuration information to the particular SPN 130. The particular SPN 130 may receive the request and may communicate with MVNO 140 in order to establish a service level agreement (SLA), a traffic contract, lease terms, billing protocols, and/or another agreement that permits user device 110 to establish a communication session with the particular SPN 130 based on the air-time rates (e.g., for a period of time associated with a bid period) and/or subscription rates (e.g., for period of time that corresponds to a subscription period) obtained from the particular SPN 130. The particular SPN 130 may send configuration information to MVNO 140 based on the established SLA, traffic contract, lease terms, billing protocols, etc. and MVNO 140 may receive the configuration information. MVNO 140 may send the configuration information to user device 110 and user device 110 may receive the configuration information.

As further shown in FIG. 6B, process 600 may include establishing a communication session with the selected SPN 130 (block 665). User device 110 may use the configuration information, received from MVNO 140, to establish a communication session with the particular SPN 130. The configuration information may include a PRL, protocol information, channel information, etc. that enables user device 110 to be reconfigured to communicate with the particular SPN 130. User device 110 may communicate with the particular SNP 130 for a particular period of time (e.g., at the air-time rate and/or subscription rate identified by the air-time auction information) and the particular SPN 130 may send a notification, to MVNO 140, that includes a quantity of minutes that user device 110 has used services from the particular SPN 130. MVNO 140 may use the quantity of minutes and/or the air-time rates and/or subscription rates to manage an account associated with user device 110.

User device 110 may establish another communication session with another SPN 130 and MVNO 140 may generate a bill, associated with user device 110, that includes a cost associated with the communication session with SPN 130 and/or another cost associated with the other communication session with the other SPN 130. For example, the bid application may, at a later point in time (e.g., after the communication session has been established), determine that a signal received from the other SPN 130 has a higher signal strength than another signal received from SPN 130. Based on the determination that the signal has a greater signal strength than the other signal, the bid application may cause the session, with SPN 130, to end and may establish the other session with the other SPN 130 in a manner described above. In another example, the bid application may, at another later point in time (e.g., after the communication session has been established), determine that an air-time rate associated with the other SPN 130 is less than another air-time rate associated with SPN 130. Based on the determination that the air-time rate is less than the other air-time rate, the bid application may cause the session, with SPN 130, to end and may establish the other session with the other SPN 130 in a manner described above.

MVNO 140 may receive information associated with the communication session and the other communication session from SPN 130 and the other SPN 130, respectively. MVNO 140 may generate the bill, associated with user device 110, based on respective costs obtained from the information associated with the communication session and the other communication session.

Systems and/or methods, described herein, may enable a user device to dynamically select via which service provider network to communicate. The systems and/or methods may base the selection of a service provider network on a respective air-time rate associated with each service provider network, a respective signal strength and/or quality associated with each service provider network, and/or other factors that are specified by a user of the user device.

The systems and/or methods may cause a user device to communicate with a mobile virtual network operator (MVNO) server in order to identify air-time raters associated with one or more service provider networks. The systems and/or methods may enable the user device to select a best price, from the identified air-time rates, and to establish a connection with a service provider network associated with the best price. The systems and/or methods may, in another example implementation, enable the user device to identify signals associated with the one or more service provider networks. The systems and/or methods may enable the user device to select a best signal (e.g., based on signal strength, signal quality, etc.) from the identified signals and to establish a connection with a service provider network associated with the best signal.

The systems and/or methods may permit the user device to automatically communicate with a service provider network at a cost that is less than another cost associated with another service provider network. Additionally, or alternatively, the systems and/or methods may permit the user device to automatically communicate with a service provider network based on a signal strength and/or signal quality that is greater than another signal strength and/or signal quality associated with another service provider network.

The foregoing description of implementations provides illustration and description, but is not intended to be exhaustive or to limit the implementations to the precise form disclosed. Modifications and variations are possible in light of the above disclosure or may be acquired from practice of the implementations.

For example, while series of blocks have been described with regard to FIGS. 4, 5, 6A and 6B, the order of the blocks may be modified in other implementations. Further, non-dependent blocks may be performed in parallel.

Further, certain portions, described above, may be implemented as a component or logic that performs one or more functions. A component or logic, as used herein, may include hardware, such as a processor, an ASIC, or a FPGA, or a combination of hardware and software (e.g., a processor executing software).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

The term "packet," as used herein, may refer to a datagram, a data item, or a cell; a fragment of a packet, a fragment of a datagram, a fragment of a data item, a fragment of a cell; or another type, arrangement, or packaging of data.

It should be emphasized that the terms "comprises"/ "comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   storing, by a user device, user preferences relating to selection of a network, from a plurality of networks, via which to establish a connection, wherein the user preferences include information for selecting the network based on rates and information for selecting the network based on signal strength or quality levels, and
   wherein the information for selecting further comprise a first weighting factor associated with the rates, a second weighting factor associated with the signal strength, a third weighting factor associated with the quality levels of the plurality of networks, and a threshold for the rates or another threshold for the signal strength, and
   wherein the first weighting factor, the second weighting factor and the third weighting factors are used to generate a rank for each of the plurality of networks;
   receiving, by the user device and from a server device that communicates with the plurality of networks, a plurality of rates associated with use of the plurality of networks;
   detecting, by the user device, signals transmitted by the plurality of networks;

determining, by the user device and for the plurality of networks, signal strength or quality levels associated with the signals transmitted by the plurality of networks;

ranking each of the plurality of networks, based on one or more of the rates, signal strength, or quality levels and the associated weighting factors;

selecting, by the user device, a particular network, of the plurality of networks, based on the user preferences, the ranking of the plurality of networks, and the threshold for the plurality of rates or the other threshold for the signal strength;

sending, to the particular network, a request to register with the particular network;

receiving, from the particular network, information confirming that the user device has been registered;

sending, to the server device, a request for configuration information associated with the particular network, where the request includes the information confirming that the user device has been registered;

receiving, from the server device, the configuration information, where the configuration information enables the user device to connect to the particular network; and establishing, by the user device, a communication session with the particular network, based on the configuration information.

2. The method of claim 1, further comprising:
sending, to the server device, a request for the plurality of rates based on an occurrence of at least one of:
 charging of the user device;
 powering up of the user device; or
 receiving, from the server device, an indication that prior air-time rates have been updated.

3. The method of claim 1, further comprising:
ranking the plurality of networks based on the signal strength or quality levels associated with the signals transmitted by the plurality of networks; and
identifying the particular network based on a determination that the particular network is ranked higher than other networks of the plurality of networks.

4. The method of claim 1, further comprising:
ranking the plurality of networks based on the plurality of rates associated with the use of the plurality of networks; and
identifying the particular network based on a determination that the particular network is ranked lower than other networks of the plurality of networks.

5. The method of claim 1, where the user preferences include information for selecting the network based on identification of a preferred network, the method further comprising:
identifying a signal that corresponds to the preferred network of the plurality networks; and
selecting, by the user device, the preferred network with which to establish another connection.

6. The method of claim 1 further comprising:
ranking the plurality of networks based on the plurality of rates to generate a respective first rank for each of the plurality networks;
ranking the plurality of networks based on the signal strength and quality levels to generate a respective second rank for the each of the plurality of networks; and
generating a score, associated with the particular network, based on a sum of a first rank, corresponding to the particular network, multiplied by the first weighting factor and a second rank, corresponding to the particular network, multiplied by the second weighting factor.

7. The method of claim 6, further comprising:
determining that the score, associated with the particular network, is greater than other scores, associated with other networks of the plurality of networks; and
selecting the particular network based on the determination that the score is greater than the other scores.

8. The method of claim 6, where ranking the plurality of networks based on the plurality of rates further includes:
determining that a first rate associated with a first network, of the plurality of networks, is less than a second rate associated with a second network, of the plurality of networks; and
ranking the first network higher than the second network based on the determination that the first rate is less than the second rate.

9. The method of claim 1, where ranking the plurality of networks based on the signal strength or quality levels further includes:
determining that a first signal strength or quality level associated with a first network, of the plurality of networks, is less than a second signal strength or quality level associated with a second network, of the plurality of networks; and
ranking the second network higher than the first network based on the determination that the first signal strength or quality level is less than the second signal strength or quality level.

10. The method of claim 1, wherein the user device is a wireless mobile communication device and the plurality of networks comprise at least one of fourth generation (4G) networks or fifth generation (5G) networks.

11. A user device comprising:
a memory to store user preferences relating to selection of a network, from a plurality of networks, via which to establish a connection, where the user preferences include information for selecting the network based on rates, information for selecting the network based on signal strength or quality levels, information for associating weighting factors with the rates, the signal strength, or the quality levels of the plurality of networks, and information associating the rates or the signal strength with a threshold; and
a processor configured to execute instructions to:
receive, from a server device that communicates with the plurality of networks, a plurality of rates associated with use of the plurality of networks,
rank the plurality of networks based on the plurality of rates,
detect signals transmitted by the plurality of networks,
determine, for the plurality of networks, signal strength or quality levels associated with the signals transmitted by the plurality of networks,
rank the plurality of networks based on the signal strength or quality levels for the plurality of networks, and the information for associating weighting factors with the rates, the signal strength, or the quality levels of the plurality of networks,
select a particular network, of the plurality of networks, based on the user preferences, the rank of the plurality of networks based on the plurality of rates, the rank of the plurality of networks based on the signal strength or quality levels, the information for associating the weighting factors, and the threshold associated with the rates or the signal strength, send, to the particular network, a request to register with the particular network, receive, from the particular network, information confirming that the user device has been registered, send, to the server device, a request for configuration information associated with the particular network, where the request includes the information confirming that the user device has been registered, receive, from the server device, the configuration information, where the configuration information enables the user device to connect to the particular network, and establish a communication session with the particular network, based on the configuration information.

12. The user device of claim 11, wherein the processor is further configured to execute instructions to:

send to the server device, a request for updating prior air-time rates, for at least some of the plurality of rates associated with the use of the plurality of networks based on an occurrence of at least one of:

charging of the user device or powering up of the user device, and receive, from the server device, a notification that the at least some of the plurality of rates have been updated.

13. The user device of claim 11, where the processor is further configured to execute instructions to:

determine that a first signal strength or quality level associated with a first network, of the plurality of networks, matches a second signal strength or quality level associated with a second network, of the plurality of networks, and select the second network with which to establish another connection based on a determination that a rate, of the plurality of rates, associated with the first network is greater than another rate, of the plurality of rates, associated with the second network.

14. The user device of claim 11, where a rate, of the plurality of rates, corresponds to at least one of:

a price per minute of services received from a network, of the plurality of networks, a subscription rate based on a quantity of services, received from the network, over a period of time that corresponds to a subscription period, or a price associated with a period of time during which the connection with the particular network is established.

15. The user device of claim 11, where the processor is further configured to execute instructions to:

receive, from the server device, an updated plurality of rates, determine that the updated plurality of rates indicate that a rate associated with the particular network, is greater than the threshold associated with the rates, select another network, of the plurality of networks, associated with another rate, of the updated plurality of rates, that are not greater than the threshold associated with the rates, and establish another connection via the other network.

16. The user device of claim 11, where the user preferences include a first weighting factor associated with the rates, where, when ranking the plurality of networks based on the plurality of rates, the processor is further configured to execute instructions to:

generate a respective order for each of the plurality of networks based on a respective rate that corresponds to each of the plurality of networks, and determine a respective rank for each of the plurality of networks by multiplying the first weighting factor by the respective order for each of the plurality of networks.

17. The user device of claim 16, where the user preferences include a second weighting factor associated with signal strength or quality levels, where, when ranking the plurality of networks based on the signal strength or quality levels, the processor is further configured to execute instructions to:

generate another respective order for each of the plurality of networks based on a respective signal strength or quality level that corresponds to each of the plurality of networks, and determine another respective rank for each of the plurality of networks by multiplying the second weighting factor by the other respective order for each of the plurality of networks.

18. The user device of claim 17, wherein the processor is further configured to execute instructions to:

determine a score associated with the particular network based on a sum of a respective rank associated with the particular network and another respective rank associated with the particular network, and select the particular network based on a determination that the score is greater than other scores associated with other networks of the plurality of networks.

19. The user device of claim 11, wherein the user device is a wireless mobile communication device and the plurality of network comprises at least one of fourth generation (4G) networks or fifth generation (5G) networks.

20. A non-transitory computer-readable medium containing one or more instructions executable by at least one processor, the computer-readable medium comprising:

one or more instructions to store user preferences relating to selection of a network, from a plurality of networks, via which to establish a connection, where the user preferences include at least one of: information for selecting the network based on rates, information for selecting the network based on signal strength levels, or information for selecting the network based on signal quality levels, and wherein each of the rates, the signal strength levels, and the signal quality levels are associated with user preferences indicating a plurality of weighting factors;

one or more instructions to receive, from a server device that communicates with the plurality of networks, a plurality of rates associated with use of the plurality of networks;

one or more instructions to detect signals transmitted by the plurality of networks;

one or more instructions to determine, for the plurality of networks, signal strength levels associated with the signals transmitted by the plurality of networks;

one or more instructions to determine, for the plurality of networks, signal quality levels associated with the signals transmitted by the plurality of networks;

one or more instructions to rank each of the plurality of networks based on at least one of the rates, signal strength levels, or signal quality levels, and the plurality of weighting factors;

one or more instructions to select a particular network, of the plurality of networks, based on the user preferences, the rank of the particular network, and the rank of each of the plurality of networks;

one or more instructions to send, to the particular network, a request to register a user device with the particular network;

one or more instructions to receive, from the particular network, information confirming that the user device has been registered;

one or more instructions to send, to the server device, a request for configuration information associated with the particular network, where the request includes the information confirming that the user device has been registered;

one or more instructions to receive, from the server device, the configuration information, where the configuration information enables the user device to connect to the particular network; and one or more instructions to establish, by the user device, a communication session with the particular network, based on the configuration information.

21. The non-transitory computer-readable medium of claim 20, further comprising:

one or more instructions to receive a request to terminate the communication session with the particular network after a period of time;

one or more instructions to establish another connection with an another network, of the plurality of networks, for another period of time that begins after the period of time; and one or more instructions to receive a bill, from the server device, that includes a first cost associated with the communication session with the particular network and a second cost associated with the other connection with the other network.

22. The non-transitory computer-readable medium of claim 20, further comprising:

one or more instructions to receive, from the particular network, information confirming that access to the particular network is authorized;

one or more instructions to send, to the server device, the information confirming that access to the particular network is authorized; and one or more instructions to receive, from the server device, information that identifies at least one of information associated with a channel, information associated with data or communication protocol, or information associated with a preferred roaming list (PRL) that enables the communication session, with the particular network, to be established.

23. The non-transitory computer-readable medium of claim 20, where the signal strength levels correspond to at least one of:

a quantity of average power associated with a signal received from one of the plurality of networks, a signal-to-noise ratio (SNR) associated with the signal, a signal-to-interference noise (SINR) associate with the signal, or a reference signal received power (RSRP) associated with the signal; and where the signal quality levels correspond to at least one of:

a reference signal received quality (RSRQ) associated with the signal, or a channel quality indicator, associated with the signal, that corresponds to a measure of channel isolation or interference associated with the signal.

24. The non-transitory computer-readable medium of claim 20, further comprising:

one or more instructions to retrieve information associated with a present location;

one or more instructions to identify, from the user preferences, a preferred network, of the plurality of networks, that corresponds to the present location; and one or more instructions to establish another connection with the preferred network based on the information associated with the present location and the user preferences.

* * * * *